United States Patent
Nguyen et al.

(10) Patent No.: US 9,260,650 B2
(45) Date of Patent: Feb. 16, 2016

(54) METHODS FOR HINDERING SETTLING OF PROPPANT AGGREGATES IN SUBTERRANEAN OPERATIONS

(75) Inventors: Philip D. Nguyen, Houston, TX (US); Tingji Tang, Houston, TX (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 582 days.

(21) Appl. No.: 13/597,545

(22) Filed: Aug. 29, 2012

(65) Prior Publication Data

US 2014/0060828 A1  Mar. 6, 2014

(51) Int. Cl.
| | |
|---|---|
| *E21B 43/267* | (2006.01) |
| *C09K 8/62* | (2006.01) |
| *C09K 8/80* | (2006.01) |
| *C09K 8/70* | (2006.01) |

(52) U.S. Cl.
CPC . *C09K 8/62* (2013.01); *C09K 8/703* (2013.01); *C09K 8/805* (2013.01); *E21B 43/267* (2013.01)

(58) Field of Classification Search
CPC ............ C09K 8/805; C09K 8/80; C09K 8/68; C09K 8/62; E21B 43/267; E21B 43/025; E21B 43/04; E21B 43/26
See application file for complete search history.

(56) References Cited

U.S. PATENT DOCUMENTS

| | | | |
|---|---|---|---|
| 4,585,064 A | 4/1986 | Graham et al. | |
| 4,670,501 A | 6/1987 | Dymond et al. | |
| 5,249,627 A | 10/1993 | Harms et al. | |
| 5,266,603 A | 11/1993 | Holzmeier | |
| 5,833,000 A | 11/1998 | Weaver et al. | |
| 5,839,510 A | 11/1998 | Weaver et al. | |
| 5,853,048 A | 12/1998 | Weaver et al. | |
| 6,059,034 A * | 5/2000 | Rickards et al. | 166/280.2 |
| 6,287,639 B1 | 9/2001 | Schmidt et al. | |
| 6,311,773 B1 | 11/2001 | Todd et al. | |
| 6,425,965 B1 | 7/2002 | Silva | |
| 6,439,309 B1 | 8/2002 | Matherly et al. | |
| 6,488,091 B1 | 12/2002 | Weaver et al. | |
| 6,582,819 B2 | 6/2003 | McDaniel et al. | |
| 6,677,426 B2 | 1/2004 | Noro et al. | |
| 7,066,258 B2 | 6/2006 | Justus et al. | |
| 7,131,491 B2 | 11/2006 | Blauch et al. | |
| 7,153,575 B2 | 12/2006 | Anderson et al. | |
| 7,281,581 B2 | 10/2007 | Nguyen et al. | |
| 7,299,869 B2 | 11/2007 | Kalman | |
| 7,350,579 B2 | 4/2008 | Gatlin et al. | |
| 7,392,847 B2 | 7/2008 | Gatlin et al. | |
| 7,541,318 B2 | 6/2009 | Weaver et al. | |
| 7,581,590 B2 | 9/2009 | Lesko et al. | |
| 7,673,686 B2 | 3/2010 | Nguyen et al. | |
| 7,819,192 B2 | 10/2010 | Weaver et al. | |
| 7,825,074 B2 | 11/2010 | Schmidt et al. | |
| 7,956,017 B2 | 6/2011 | Gatlin et al. | |
| 8,003,579 B2 | 8/2011 | Akarsu et al. | |
| 8,076,271 B2 | 12/2011 | Blauch et al. | |
| 2002/0011334 A1 * | 1/2002 | Biegler et al. | 166/278 |
| 2006/0175058 A1 * | 8/2006 | Nguyen | 166/280.2 |
| 2007/0131422 A1 | 6/2007 | Gatlin et al. | |
| 2007/0131425 A1 | 6/2007 | Gatlin et al. | |
| 2007/0277978 A1 * | 12/2007 | Reddy et al. | 166/276 |
| 2007/0289781 A1 | 12/2007 | Rickman et al. | |
| 2008/0006405 A1 | 1/2008 | Rickman et al. | |
| 2010/0089581 A1 | 4/2010 | Nguyen et al. | |
| 2010/0160187 A1 | 6/2010 | Nguyen et al. | |
| 2010/0179281 A1 | 7/2010 | Nilsen | |
| 2010/0212898 A1 | 8/2010 | Nguyen et al. | |
| 2010/0280210 A1 | 11/2010 | Kitamura et al. | |
| 2010/0316447 A1 | 12/2010 | Schmidt et al. | |
| 2011/0030950 A1 | 2/2011 | Weaver et al. | |
| 2011/0039737 A1 | 2/2011 | Schmidt et al. | |
| 2011/0056684 A1 | 3/2011 | Willberg et al. | |
| 2011/0067868 A1 | 3/2011 | Le Roy-Delage et al. | |
| 2011/0098394 A1 | 4/2011 | Schmeltzer et al. | |

* cited by examiner

*Primary Examiner* — Zakiya W Bates

(74) *Attorney, Agent, or Firm* — McDermott Will & Emery LLP; Craig W. Roddy

(57) ABSTRACT

Methods of fracturing a subterranean formation comprising introducing a fracturing fluid into the subterranean formation at a pressure sufficient to create or enhance at least one fracture therein. And providing proppant aggregates themselves comprising proppant particles coated with a binding fluid and having foamed particulates adhered thereto that are suspended in gelled treatment fluid and placed into at least a portion of the fracture so as to form a proppant pack therein.

18 Claims, No Drawings

METHODS FOR HINDERING SETTLING OF PROPPANT AGGREGATES IN SUBTERRANEAN OPERATIONS

BACKGROUND

The present invention relates to methods of treating subterranean formations with treatment fluids comprising proppant aggregate suspension aids.

Subterranean wells (e.g., hydrocarbon producing wells, water producing wells, and injection wells) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids, such as graded sand, bauxite, ceramics, or even nut hulls, are suspended in a treatment fluid and then deposited in the fractures. These particulate solids, or "proppant particulates," are generally deposited in the fracture in a concentration such that they form a tight pack of particulates, or "proppant packs," which serve to prevent the fractures from fully closing once the hydraulic pressure is removed. By keeping the fracture from fully closing, the proppant particulates aid in forming conductive paths through which fluids may flow.

Gelled treatment fluids, because of their increased viscosity, are useful in transporting and depositing proppant particulates into subterranean fractures. Additionally, crosslinking agents are often used to further increase the viscosity and stability of gelled treatment fluids to further enhance the fluid's utility in some downhole environments.

In traditional subterranean operations, the specific gravity of individual proppant particulates is high in relation to the gelled treatment fluid in which they are suspended for transport and deposit in a fracture. Therefore, the proppant particulates tend to settle to the bottom portion of a fracture. The settling nature of traditional proppant particulates can result in complete occlusion of a portion of the fracture where no proppant particulates have collected (e.g., at the top portion of the fracture) when the fracture closes, impairing fracture conductivity and production over the life of a subterranean well.

One way to compensate for proppant particulate settling and partial fracture closure is to transport and deposit the highest possible concentration of proppant particulates into a fracture in order to decrease the likelihood of void space in the fracture. However, increasing the proppant particulate concentration in a treatment fluid generally requires a higher concentration of gelling agents and/or crosslinker within the gelled treatment fluid. As many gelling and crosslinking agents are used in a variety of fluids outside the oil and gas industry, their demand is increasing while their supply is decreasing. Therefore, the cost of gelling and crosslinking agents is increasing, and consequently, the cost of subterranean operations requiring the highest possible concentration of proppant particulates is also increasing.

The degree of success of a fracturing operation depends, at least in part, upon fracture conductivity once the fracturing operation has ceased and production commenced. Therefore, a practical method of hindering the settling rate of proppant particulates suspended in a treatment fluid in order to prevent partial fracture closure while decreasing quantity and cost of gelling and crosslinking agent may be of value to one of ordinary skill in the art.

SUMMARY OF THE INVENTION

The present invention relates to methods of treating subterranean formations with treatment fluids comprising foam particulates.

In some embodiments, the present invention provides for a method of fracturing a subterranean formation comprising: introducing a fracturing fluid into the subterranean formation at a pressure sufficient to create or enhance at least one fracture therein; providing proppant aggregates themselves comprising proppant particles coated with a binding fluid and having foamed particulates adhered thereto; and placing the proppant aggregates suspended in gelled treatment fluid into at least a portion of the fracture so as to form a proppant pack therein.

In other embodiments, the present invention provides for a method of fracturing a subterranean formation comprising: introducing a fracturing fluid into the subterranean formation at a pressure sufficient to create or enhance at least one fracture therein; providing proppant coated with binding fluid to create coated proppant; providing foamed particulates; suspending the coated proppant and the foamed particulates in a gelled treatment fluid; allowing the foamed particulates to interact with the coated proppant in the gelled treatment fluid such that the foamed particulates adhere thereto and create proppant aggregates; and placing the proppant aggregates into a portion of the fracture so as to form a proppant pack therein.

The features and advantages of the present invention will be readily apparent to those skilled in the art upon a reading of the description of the preferred embodiments that follows.

DETAILED DESCRIPTION

The present invention relates to methods of treating subterranean formations with treatment fluids comprising foam particulates.

The methods described herein employ a foam particulate to hinder or reduce the settling tendency of traditional proppant particulates. The disclosed methods may be suitable for use in the oil and gas industry because they facilitate subterranean fracture formation by reducing the treatment fluid quantity required to deposit more uniformly distributed proppant aggregates to prevent partial fracture closure. It will be appreciated, however, that the various disclosed systems and methods are equally applicable to other technology fields where it may be advantageous to reduce the specific gravity of a particle or particulate.

In one embodiment, the present invention provides a method of fracturing a subterranean formation comprising introducing a fracturing fluid into the subterranean formation at a pressure sufficient to create or enhance at least one fracture; providing proppant aggregates themselves comprising proppant particulates coated with a binding fluid and having foamed particles adhered thereto; and placing the proppant aggregates suspended in a gelled treatment fluid into at least a portion of the fracture so as to form a proppant pack. As used herein, the term "proppant aggregate(s)" refers to a coherent body comprised of proppant particulate(s), binding fluid, and foam particle(s). As used herein, the term "proppant particulate(s)" refers to any material or formulation that can be used to hold open at least a portion of a subterranean fracture. As used herein, the term "binding fluid" refers to any material or formulation that can be coated onto proppant particulate(s) and exhibits a sticky or tacky character capable of confining proppant particulates together or confining proppant particulate(s) and foam particle(s) together. As used herein, the term "foam particle(s)" refers to any material or formulation that can be used to lower the overall or apparent specific gravity of proppant aggregates.

Due to their placement in the fracture(s), proppant aggregates function as pillars or masses to support and hold the fracture from completely closing. The relatively low specific gravity property of the proppant aggregates of the present invention conferred by the adhered foam particle(s) may exhibit neutral or nearly neutral buoyancy when suspended in treatment fluid. The proppant aggregates thus resist settling to the bottom portion of the fracture and may be more uniformly distributed within the fracture than traditional, higher specific gravity, proppant particulates, thus, reducing the risk of partial fracture closure.

In some embodiments, the proppant aggregates may be formed randomly, or "on-the-fly," at the well site by placing discrete amounts of proppant particulates coated with binding fluid and foam particles within the gelled treatment fluid. These proppant aggregates are produced on-the-fly because they do not form until the discrete amounts are added to the treatment fluid and interact and adhere to form proppant aggregates as they proceed down the well bore. These on-the-fly embodiments may be advantageous because, among other benefits, they remove the requirement of an additional operation before fracturing.

In other embodiments, the proppant aggregates may be formed prior to introduction into the subterranean formation. These embodiments may be advantageous because, among other benefits, they remove the uncertainty of on-the-fly proppant aggregate formation and provide for a known concentration of proppant aggregates being introduced into a formation.

I. Fracturing and Treatment Fluids

According to some embodiments of the present invention, a fracturing system may be used to create or enhance at least one fracture in a subterranean formation. In these embodiments, any fluid suitable for a fracturing or frac-packing application may be used in accordance with the teachings of the present invention as a fracturing fluid, such as for example, slick water, gelled treatment fluids, including aqueous gels, viscoelastic surfactant gels, oil gels, foamed gels, emulsions, and any combination thereof. For simplicity, these fluids may be herein jointly referred to as "treatment fluids" prior to inclusion of any additional elements. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a foaming agent and a gas, such as carbon dioxide or nitrogen. In some embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, in situ, reduces fluid loss and allows the fluid to transport significant quantities of suspended proppant particles. The water used to form the treatment fluid may be salt water, brine, or any other aqueous liquid that does not adversely react with the other components. The density of the water can be increased to provide additional transport and suspension in the present invention.

A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, carboxymethyl guar and cellulose derivatives, such as carboxylmethyl cellulose, hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued to Weaver, et al., the entire disclosure of which is incorporated herein by reference. Suitable gelling agents generally are present in the viscosified treatment fluids of the present invention in an amount in the range of from about 0.1% to about 5% by weight of the water therein. In certain embodiments, the gelling agents are present in the treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers generally are present in the treatment fluids of the present invention in an amount sufficient to provide, in situ, the desired degree of crosslinking between gelling agent molecules. In certain embodiments of the present invention, the crosslinkers may be present in an amount in the range from about 0.001% to about 10% by weight of the water in the treatment fluid. In other embodiments of the present invention, the crosslinkers may be present in the treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the treatment fluids to revert to thin fluids that can be produced back to the surface after they have been used to place the proppant aggregates in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

In some embodiments, degradable, solids-free gel bodies may be included in the treatment fluid. Solids-free gel bodies may act to increase the voids or channels between proppant packs after the fracture closes. Once placed within a fracture, the degradable components are allowed to break down into a liquid phase and are then removed from the propped fracture, leaving behind proppant packs, formed from proppant aggregate, that act as pillars or masses to keep the fracture from closing while allowing voids and channels to form surrounding the proppant packs. Preferably, the pressure within the subterranean formation is allowed to reduce below the pressure sufficient to create or enhance fractures within the subterranean formation after the gel bodies are placed and before the solids-free gel bodies degrade.

Solids-free gel bodies are in a form such as a blob, fragment, or chunk and are designed to degrade over time in the treatment fluid. Degradable fibers may be included within the solids-free gel bodies and may exist partially inside of the gel body and partially outside. This may help suspend the gel bodies within the treatment fluid and may also act to keep the gel bodies from merging into single, larger gel bodies.

The amounts of degradable solids-free gel bodies are generally selected to effectively surround the proppant aggregates. Thus, in preferred embodiments, the degradable solids-free gel bodies are present in greater quantity than the proppant aggregates such that the proppant aggregates are spaced apart from one another within a fracture, forming high porosity propped fractures. As used herein, the term "high porosity fracture" refers to a proppant fracture having a porosity greater than about 40%.

Gel bodies suitable for use in the present invention include those described in U.S. Pat. App. Pub. No. 2010/0089581, the entire disclosure of which is hereby incorporated by reference. In addition, the super-absorbent polymer discussed in U.S. Pat. App. Pub. No. 2011/0067868, the entire discussion of which is hereby incorporated by reference, may also be suitable for use as gel bodies in the present invention. One of ordinary skill in the art will recognize that some of the gel bodies may be designed to degrade once the fracture closes.

By way of example, gel bodies of the present invention may be formed from swellable particulates composed of swellable organic material, such as a polymer or a salt of a polymeric material. Typical examples of polymeric materials include, but are not limited to, cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion. Typical examples of suitable salts of polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. The specific features of the swellable particulate may be chosen or modified to provide a proppant pack with desired permeability while maintaining adequate propping and filtering capability. These swellable particulates are capable of swelling upon contact with a swelling agent. The swelling agent for the swellable particulate can be any agent that causes the swellable particulate to swell via absorption of the swelling agent. In a preferred embodiment, the swellable particulate is "water swellable," meaning that the swelling agent is water. Suitable sources of water for use as the swelling agent include, but are not limited to, fresh water, brackish water, sea water, brine, and any combination thereof in any proportion. In another embodiment of the invention, the swellable particulate is "oil swellable," meaning that the swelling agent for the swellable particulate is an organic fluid. Examples of organic swelling agents include, but are not limited to, diesel, kerosene, crude oil, and any combination thereof in any proportion.

Also by way of example, degradable gel bodies of the present invention may be formed from super-absorbent polymers. Suitable such super-absorbent polymers include polyacrylamide, crosslinked poly(meth)acrylate, and non-soluble acrylic polymers.

II. Proppant Particulates

A. Proppant Particulates—Size and Shape

Proppant particulates suitable for use in the methods of the present invention may be of any size and shape combination known in the art as suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 180 mesh, U.S. Sieve Series. A major advantage of using this method is there is no need for the solid particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. By so resisting settling, substantially non-spherical proppant particulates may provide improved proppant particulate distribution as compared to more spherical proppant particulates.

B. Proppant Particulates—Materials

Proppant particulates suitable for use in the present invention may comprise any material suitable for use in subterranean operations. Suitable materials for these proppant particulates include, but are not limited to, sand (such as beach sand, desert sand, or graded sand), bauxite, ceramic materials, glass materials (such as crushed, disposal glass material), polymer materials (such as EVA or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cements (such as Portland cements), fly ash, carbon black powder, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles for use in conjunction with the present invention may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

III. Binding Fluids

Binding fluids used in the present invention exhibit a sticky or tacky character. As used herein, the term "tacky," in all of its forms, generally refers to a substance having a nature such that it is (or may be activated to become) somewhat sticky to the touch. Among other things, the binding fluid is used to adhere proppant particulate(s) to foam particle(s) to form proppant aggregate(s) during pre-fracturing proppant aggregate formation, preventing the proppant aggregate(s) from dispersion when introduced downhole. Similarly, the binding fluid encourages proppant particulate(s) to interact with the foam particle(s) to form proppant aggregates during on-the-fly applications.

Suitable binding fluids for use in the present invention include, but are not limited to, non-aqueous tackifying agents, aqueous tackifying agents, silyl-modified polyamide compounds, zeta-potential modifying agents, binders, curable resins that are capable of curing to form hardened substances, silicon-based resins, or any combination thereof. The type and amount of binding fluid included in a particular method of the present invention may depend upon, among other factors, the composition and/or temperature of the subterranean formation, the chemical composition of formations fluids, the flow rate of fluids present in the formation, the effective porosity and/or permeability of the subterranean formation, pore throat size and distribution, and the like. Furthermore, the concentration of the binding fluid can be varied, inter alia, to either enhance bridging to provide for a more rapid coating of the binding fluid or to minimize bridging to allow deeper penetration into the subterranean formation. It is within the ability of one skilled in the art, with the benefit of this disclosure, to determine the type and amount of binding fluid to include in the methods of the present invention to achieve the desired results.

Nonlimiting examples of suitable non-aqueous tackifying agents may be found in U.S. Pat. Nos. 7,392,847; 7,350,579; 5,853,048; 5,839,510; and 5,833,000, the entire disclosures of which are herein incorporated by reference. Nonlimiting examples of suitable aqueous tackifying agents may be found in U.S. Pat. Nos. 8,076,271, 7,131,491, 5,249,627 and 4,670,501, the entire disclosures of which are herein incorporated by reference. Nonlimiting examples of suitable silyl-modified polyamide compounds may be found in U.S. Pat. No. 6,439,309 entitled the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication Nos. 2010/0212898 and 2008/0006405, the entire disclosures of which are herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0280210, 2010/0179281, and 2010/0212898 the entire disclosures of which are herein incorporated by reference. It is within the ability of one skilled in the art, with the benefit of this disclosure, to determine the type and amount of consolidating agent to include in the methods of the present invention to achieve the desired results. Further detail on suitable bindings fluid can be found below.

Non-Aqueous Tackifying Agents

In some embodiments of the present invention, the consolidating agent may comprise a non-aqueous tackifying agent. A particularly preferred group of non-aqueous tackifying agents comprises polyamides that are liquids or in solution at the temperature of the subterranean formation such that they are, by themselves, nonhardening when introduced into the subterranean formation. A particularly preferred product is a condensation reaction product comprised of a commercially available polyacid and a polyamine. Such commercial products include compounds such as combinations of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well.

Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Non-aqueous tackifying agents suitable for use in the present invention may either be used such that they form a nonhardening coating on a surface or they may be combined with a multifunctional material capable of reacting with the non-aqueous tackifying agent to form a hardened coating. A "hardened coating" as used herein means that the reaction of the tackifying compound with the multifunctional material should result in a substantially non-flowable reaction product that exhibits a higher compressive strength in a consolidated agglomerate than the tackifying compound alone with the particulates. In this instance, the non-aqueous tackifying agent may function similarly to a hardenable resin.

Multifunctional materials suitable for use in the present invention include, but are not limited to, aldehydes; dialdehydes such as glutaraldehyde; hemiacetals or aldehyde releasing compounds; diacid halides; dihalides such as dichlorides and dibromides; polyacid anhydrides; epoxides; furfuraldehyde; aldehyde condensates; and silyl-modified polyamide compounds; and the like; and combinations thereof. Suitable silyl-modified polyamide compounds that may be used in the present invention are those that are substantially self-hardening compositions capable of at least partially adhering to a surface or to a particulate in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multifunctional material may be mixed with the tackifying compound in an amount of about 0.01% to about 50% by weight of the tackifying compound to effect formation of the reaction product. In other embodiments, the multifunctional material is present in an amount of about 0.5% to about 1% by weight of the tackifying compound. Suitable multifunctional materials are described in U.S. Pat. No. 5,839,510 issued to Weaver, et al., the entire disclosure of which is herein incorporated by reference.

Aqueous Tackifying Agents

Aqueous tackifying agents suitable for use in the present invention are usually not generally significantly tacky when placed onto a particulate, but are capable of being "activated" (e.g., destabilized, coalesced and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water. The aqueous tackifier agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure-sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers; derivatives thereof, and combinations thereof.

Some suitable tackifying agents comprise at least one member selected from the group consisting of benzyl coco di-(hydroxyethyl) quaternary amine, p-T-amyl-phenol condensed with formaldehyde, and a copolymer comprising from about 80% to about 100% C1-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Silyl-Modified Polyamides

Silyl-modified polyamide compounds may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

Zeta Potential-Modifying Agents

In some embodiments, the consolidating agent may comprise an aggregating composition which can modify the zeta potential or aggregation potential of a particulate. Such modifications can permit any two surfaces (e.g., of particulates, of a particulate and a substrate, etc.) to have a greater attraction for one another.

Aggregating compositions suitable for use in the present invention include, but are not limited to, a reaction product of an amine and a phosphate ester, where the aggregating composition is designed to coat a surface with the reaction product to change the zeta potential or aggregation potential of the surface. Suitable aggregating compositions and their methods of use can be found in U.S. Pat. No. 7,392,847, filed Dec. 9, 2005 and U.S. Pat. No. 7,956,017, filed May 6, 2008, the entire disclosures of which are hereby incorporated by reference.

Suitable amines include, but are not limited to, any amine that is capable of reacting with a suitable phosphate ester to form a composition that forms a deformable coating on a surface. Exemplary examples of such amines include, but are not limited to, any amine of the general formula R1,R2NH or mixtures or combinations thereof, where R1 and R2 are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters include, but are not limited to, any phosphate ester that is capable of reacting with a suitable amine to form a composition that forms a deformable coating on a surface. Exemplary examples of such phosphate esters include, but are not limited to, any phosphate esters of the general formula P(O)(OR3)(OR4)(OR5) or mixture or combinations thereof, where R3, R4, and OR5 are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, but are not limited to, phosphate ester of alkanols having the general formula P(O)(OH)x(OR6)y where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, but are not limited to, phosphate esters of alkanol amines having the general formula N[R7OP(O)(OH)2]3 where R7 is a carbenzyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, but are not limited to, phosphate esters of hydroxylated aromatics such as phosphate esters of alkylated phenols such as Nonylphenyl phosphate ester or phenolic phosphate esters. Other exemplary examples of phosphate esters include, but are not limited to, phosphate esters of diols and polyols such as phosphate esters of ethylene glycol, propylene glycol, or higher glycolic structures. Other exemplary phosphate esters include, but are not limited to, any phosphate ester than can react with an amine and coated on to a substrate forms a deformable coating enhancing the aggregating potential of the substrate.

Binders

In addition, binders suitable for using the present invention may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the present invention may generally comprise (I) a consolidant comprising a hydrolyzate or precondensate of:

(a) at least one organosilane of the general formula (I):

$$R_nSiX_{4-n} \quad (I)$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general formula (II)

$$SiX_4 \quad (II)$$

in which the X radicals are each as defined above, and (c) at least one metal compound of the general formula (III)

$$MX_a \quad (III)$$

in which M is a metal of main groups I to VIII or of transition groups II to VIII of the Periodic Table of the Elements including boron, X is as defined in formula (I), where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the consolidant is cured under elevated pressure and elevated temperature, where the consolidant, in the case that it is used to change the wetting behavior of the formation, also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

Resins

Resins suitable for use in the consolidation fluids of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, silicon-based resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the present invention. Preferred solvents include those listed above in connection with tackifying compounds. It is within the ability of one skilled in the art, with the benefit of this disclosure, to determine whether and how much solvent is needed to achieve a suitable viscosity.

Silicon-Based Resins

Suitable silicon-based resins include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and has a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the present invention is a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include:

(a) a compound comprising a reactive group of formula (I):
—X—SiR''$_x$(OR')$_{3-z}$
wherein X comprises a hydrocarbon chain; wherein x=0 to 2 and z=0 to 2; wherein R' and R'' comprises hydrogen, a halogen, an amide, a halogen, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R'' may be the same (identical) or different; and wherein when z is 0 or 1, then each R' may be the same or different; and, (b) a polysiloxane comprising a reactive functional group that comprises at least one of the following structural units: $R^1{}_n R^2{}_m SiO_{(4-n-m)/2}$
wherein $R^1$ comprises hydrogen, hydroxyl, a hydrocarbon chain, or a siloxane chain; wherein $R^2$ comprises a functional group; and wherein m and n fulfill the requirements of 0<n<4, 0<m<4 and 2<(m+n)<4; and wherein when n>1, then each $R^1$ may be the same or different; and wherein when m>1, then each $R^2$ may be the same or different. In certain embodiments, the functional group of $R^2$ comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Still other suitable silicon-based resins include (a) a compound comprising an organofunctional polysiloxane polymer as a binding resin obtaining the polymeric structure as part of a curing mechanism or a combination thereof. The curing mechanism of such siloxane coatings is a two step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the formula:

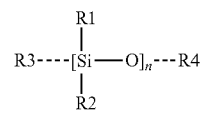

wherein, for each repeating polymer unit, $R^1$, $R^2$ and $R^3$ are independently selected from the group consisting of alkyl, aryl, reactive glycidoxy groups having up to 20 carbon atoms, and OSi(OR5)$_3$ groups, wherein each R5 independently has the same meaning as R1, R2 or R3, and R4 are is either alkyl, aryl or hydrogen, and wherein n is selected so as that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins comprise a silane coupling agent and a polymer having a reactive silicon end group. In some embodiments, these suitable silicon-based resins may also include a catalyst operable to facilitate the curing of the polymer. Generally, any suitable polymer that can be prepared with reactive silicon end groups may be used, examples of suitable polymers include, but are not limited to, polyalkyls, such as polyethers, polyalkanes, polyalkenes, and polyalkynes; substituted alkyl monomers, such as styrene; acrylics; and combinations thereof. Examples of suitable reactive silicon end groups include, but are not limited to, triethoxysilanes, methyldiethoxysilanes, trisilanols, alkoxysilanes, substituted silanes, multi-silanols, and combinations thereof. One suitable polymer having a reactive silicon end group that may be used in particular embodiments of the present invention is a silane-modified poly(propylene oxide) oligomer.

Generally, any suitable silane coupling agent may be used in this silicon-based resin. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy)silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylm-ethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltris (beta-methoxyethoxy)silane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-[3-(trimethoxysilyl)propyl]-ethylenediamine; substituted silanes where one or more of the substitutions contains a different functional group; and combinations thereof. In some embodiments, the silane coupling agent may be present in the curable adhesive composition in an amount from about 0.1% to about 5% by weight of the composition, and preferably in an amount from about 0.5% to about 3% by weight of the composition.

In some embodiments, this silicon-based resins may also comprise an optional catalyst to facilitate the curing of the adhesive composition. Generally, any suitable catalyst may be used in the curable adhesive compositions of the present invention. Examples of suitable catalysts include, but are not limited to, tertiary amine catalysts, titanium chelate catalysts, tin catalysts, lead catalysts, bismuth catalysts, and combinations thereof. One suitable catalyst that may be used in particular embodiments of the present invention is dibutylbis(2, 4-pentanedionate-O,O')—, (OC-6-11). In some embodiments, the catalyst may be present in the curable adhesive composition in an amount from about 0.1% to about 5% by weight of the composition, and preferably in an amount from about 1% to about 3% by weight of the composition.

IV. Foam Particles

Any suitable material or formulation that may be employed in subterranean operations to lower the specific gravity of proppant particulate(s) when adhered thereto may be used in accordance with the teachings of the present invention. Suitable foam particles include, but are not limited to, foamed polystyrene, foamed polyurethane, foamed polyvinyl alcohol, foamed polyacrylonitrile, foamed isocyanate-based polymers, foamed polyethylene, foamed polypropylene, foamed poly(lactic acid), foamed poly(lactic acid)/starch or any combination thereof. Foam particles may be either degradable (such as biofoam particles) or nondegradable depending on the particular subterranean operations. Nondegradable foam particles may be embedded with the proppant particulates of the present invention and form a portion of a proppant pack. An example of a suitable commercially available foam polystyrene is STYROFOAM, available from Universal Foam Products of Hunt Valley, Md. An example of a suitable commercially available foamed polyurethane is LAST-A-FOAM, available from General Plastics Manufacturing Co. of Tacoma, Wash. An example of a suitable commercially available foamed poly(lactic acid) is E-PLA, available from Synbra Technology of Etten-Leur, The Netherlands. Foamed PLA such as E-PLA will go through degradation through hydrolysis in the downhole condition and leads to enhanced conductivity in the proppant pack upon disappearing. Other foamed particles such as foamed polypropylene will be dissolved in the produced crude oil and also leads to an enhanced conductivity.

Foam particles may be in any suitable concentration relative to proppant particulates sufficient to create a propped fracture after fracture closure. The type and amount of foam particles used in a particular method of the present invention may depend upon, among other factors the type, size and distribution and amount of proppant particulates, composition and/or temperature of the subterranean formation, the chemical composition of formations fluids, the flow rate of fluids present in the formation, the effective porosity and/or permeability of the subterranean formation, pore throat size and distribution, and the like. Individuals skilled in the art, with the benefit of this disclosure, will recognize the exact type, size and distribution and amount of foam particles to use depending the particular subterranean operations.

Foam particle(s) may be of any size or shape combination suitable for introduction into a subterranean fracture after adhering to proppant particulate(s). Preferably, the size or shape of the foam particles will be such that when they form proppant aggregates by interacting and adhering to the proppant particulates, the proppant aggregates will be of a size and shape sufficient to create voids or channels within the entire span of the fracture, creating a high porosity propped fracture.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of fracturing a subterranean formation comprising:
    introducing a fracturing fluid into the subterranean formation at a pressure sufficient to create or enhance at least one fracture therein;
    providing proppant aggregates comprising proppant particulates coated with a binding fluid and having foamed particles adhered to the surface of the proppant particulates by the binding fluid; and
    placing the proppant aggregates suspended in a gelled treatment fluid into at least a portion of the fracture so as to form a proppant pack therein.

2. The method of claim 1 wherein the fracturing fluid is selected from the group consisting of aqueous gels, viscoelastic surfactant gels, oil gels, foamed gels, emulsions, and any combination thereof.

3. The method of claim 1 wherein the proppant particulates are selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

4. The method of claim 1 wherein the binding fluid is selected from the group consisting of a non-aqueous tackifying agent, an aqueous tackifying agent, a silyl-modified polyamide, a zeta-potential modifying agent, a silicon-based resin, a curable resin composition, a binder, and any combination thereof.

5. The method of claim 1 wherein the foam particles are selected from the group consisting of foamed polystyrene, foamed polyethylene, foamed polypropylene, foamed polyurethane, foamed polyvinyl alcohol, foamed isocyanate-based polymer, foamed poly(lactic acid), foamed poly(lactic acid)/starch and any combination thereof.

6. The method of claim 1 wherein the foam particles are degradable.

7. The method of claim 1 wherein the gelled treatment fluid is selected from the group consisting of aqueous gels, viscoelastic surfactant gels, oil gels, foamed gels, emulsions, and any combination thereof.

8. The method of claim 1 wherein within the gelled treatment fluid are solids-free gel bodies comprising a swellable polymer selected from the group consisting of a cross-linked polyacrylamide, a crosslinked poly(meth)acrylate, a cross-linked polyacrylate, a cross-linked copolymer of acrylamide and acrylate monomer, a starch grafted with acrylonitrile and acrylate, a cross-linked polymer of two or more of allylsulfonates, 2-acrylamido-2-methyl-1-propanesulfonic acid, 3-allyloxy-2-hydroxy-1-propanesulfonic acid, acrylamide, an acrylic acid monomer, a non-soluble acrylic polymer, and any combination thereof.

9. The method of claim 8 wherein the gel bodies comprise a salt selected from the group consisting of a salt of carboxyalkyl starch, a salt of carboxymethyl starch, a salt of carboxymethyl cellulose, a salt of cross-linked carboxyalkyl polysaccharide, a starch grafted with acrylonitrile and acrylate monomers, and any combination thereof.

10. A method of fracturing a subterranean formation comprising:
    introducing a fracturing fluid into the subterranean formation at a pressure sufficient to create or enhance at least one fracture therein;
    providing proppant particulates coated with a binding fluid to create coated proppant;
    providing foamed particles;
    suspending the coated proppant and the foamed particles in a gelled treatment fluid;
    allowing the foamed particles to interact with the coated proppant in the gelled treatment fluid such that the foamed particles adhered to the surface of the proppant particulates by the binding fluid and create proppant aggregates; and
    placing the proppant aggregates into at least a portion of the fracture so as to form a proppant pack therein.

11. The method of claim 10 wherein the fracturing fluid is selected from the group consisting of aqueous gels, viscoelastic surfactant gels, oil gels, foamed gels, emulsions, and any combination thereof.

12. The method of claim 10 wherein the proppant particulates are selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

13. The method of claim 10 wherein the binding fluid is selected from the group consisting of a non-aqueous tackifying agent, an aqueous tackifying agent, a silyl-modified polyamide, a zeta-potential modifying agent, a silicon-based resin, a curable resin composition, a binder, and any combination thereof.

14. The method of claim 10 wherein the foam particles are selected from the group consisting of foamed polystyrene, foamed polyurethane, foamed polyvinyl alcohol, foamed isocyanate-based polymer, foamed poly(lactic acid), and any combination thereof.

15. The method of claim 10 wherein the foam particles are degradable.

16. The method of claim 10 wherein the gelled treatment fluid is selected from the group consisting of aqueous gels, viscoelastic surfactant gels, oil gels, foamed gels, emulsions, and any combination thereof.

17. The method of claim 10 wherein within the gelled treatment fluid are solids-free gel bodies comprising a swellable polymer selected from the group consisting of a cross-linked polyacrylamide, a crosslinked poly(meth)acrylate, a cross-linked polyacrylate, a cross-linked copolymer of acrylamide and acrylate monomer, a starch grafted with acrylonitrile and acrylate, a cross-linked polymer of two or more of allylsulfonates, 2-acrylamido-2-methyl-1-propanesulfonic acid, 3-allyloxy-2-hydroxy-1-propanesulfonic acid, acrylamide, an acrylic acid monomer, a non-soluble acrylic polymer, and any combination thereof.

18. The method of claim 17 wherein the gel bodies comprise a salt selected from the group consisting of a salt of carboxyalkyl starch, a salt of carboxymethyl starch, a salt of carboxymethyl cellulose, a salt of cross-linked carboxyalkyl polysaccharide, a starch grafted with acrylonitrile and acrylate monomers, and any combination thereof.

* * * * *